United States Patent [19]

Ploeger

[11] Patent Number: 4,704,667
[45] Date of Patent: Nov. 3, 1987

[54] CONTOURED HEADLIGHT CONCEALMENT LENS

[76] Inventor: Gregory L. Ploeger, 205 S. W. Westlawn Dr., Ankeny, Iowa 50021

[21] Appl. No.: 915,984

[22] Filed: Oct. 6, 1986

[51] Int. Cl.$^4$ .............................................. F21V 9/12
[52] U.S. Cl. ...................................... 362/318; 362/80; 350/312
[58] Field of Search ........................... 362/61, 80, 318; 350/267, 312

[56] References Cited

U.S. PATENT DOCUMENTS

| 1,193,942 | 8/1916 | Starkweather et al. | 362/318 |
| 1,199,534 | 9/1916 | Ernst | 362/318 |
| 1,964,861 | 7/1934 | Smith | 362/318 |
| 2,438,196 | 3/1948 | Washington | 362/293 |
| 2,515,406 | 7/1950 | Howard | 340/50 |
| 2,904,672 | 9/1959 | Fischer | 362/318 |
| 3,368,862 | 2/1968 | Dean | 350/312 |
| 4,480,291 | 10/1984 | Dranginis | 362/80 |
| 4,495,549 | 1/1985 | Careson et al. | 362/62 |

FOREIGN PATENT DOCUMENTS 357500  3/1929  United Kingdom ................ 362/318

*Primary Examiner*—Samuel Scott
*Assistant Examiner*—Noah Kamen
*Attorney, Agent, or Firm*—Henderson & Sturm

[57] ABSTRACT

A contoured concealment lens for vehicle headlights. The lens conforms to the contour of the vehicle body and includes an internal cavity that is selectively filled with an opaque fluid when the headlights are not in use. The concealment lens has no adverse influence on the aerodynamics of the vehicle when the lights are in use and it is aesthetically compatable with the vehicle at all times.

3 Claims, 7 Drawing Figures

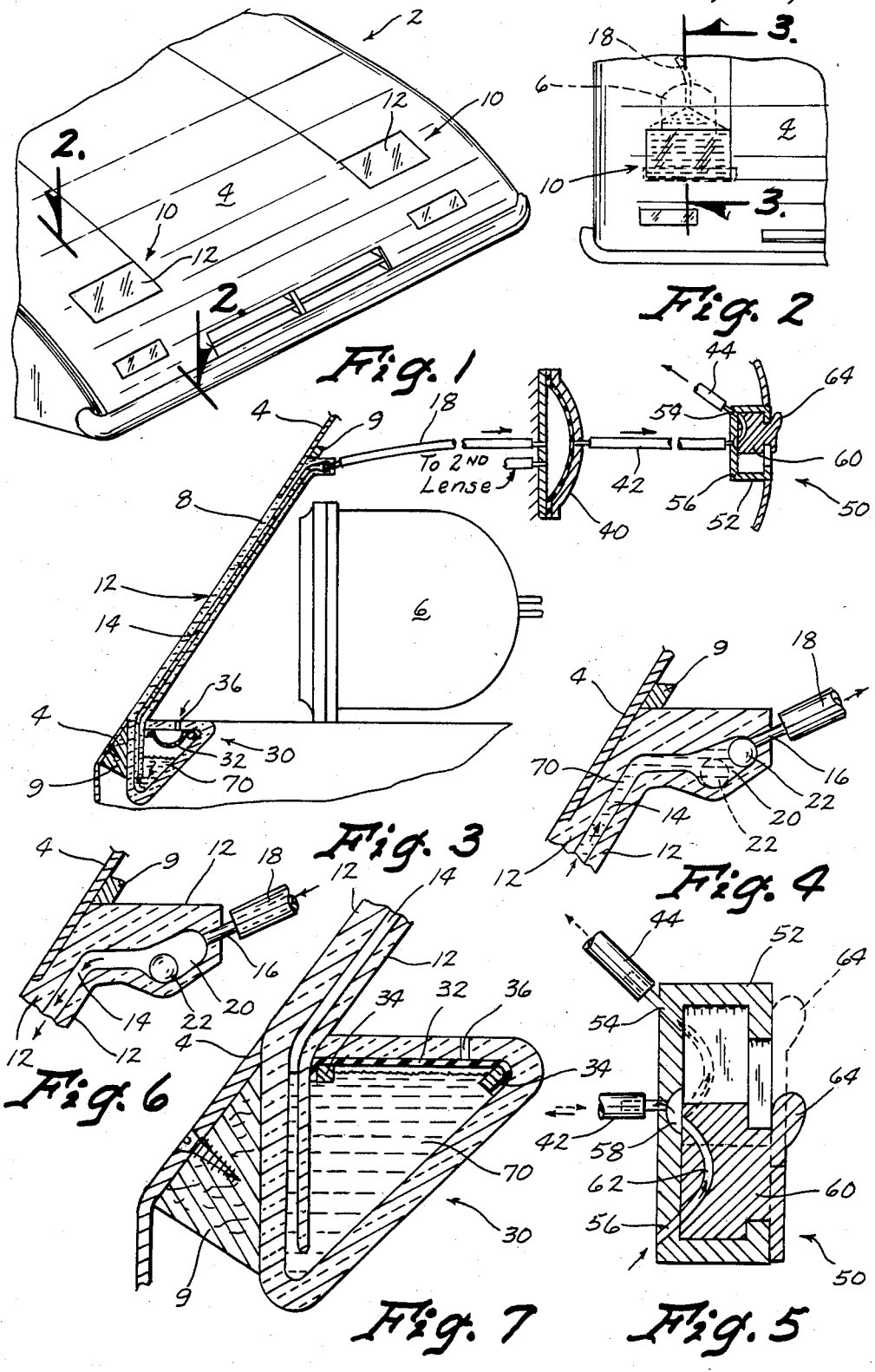

CONTOURED HEADLIGHT CONCEALMENT LENS

TECHNICAL FIELD

This invention relates to automotive accessories and more particularly to a device for concealing automotive headlights when they are not in use.

BACKGROUND ART

Various structures have been provided to enhance the appearance of automobiles by concealing the headlights. Such structures are typically complicated and result in increased maintenance problems.

Several known structures include a member that smoothly conforms to the contour of the vehicle body when the headlights are not in use. This design favorably influences the aerodynamics of the vehicle. These structures, however, generally pivot to a position where the headlights are raised above the contour of the vehicle body when the lights are in use. In this raised position, the headlights adversely affect both the aesthetic appearance and the aerodynamics of the vehicle.

Those concerned with these and other problems recognize the need for an improved device for concealing vehicle headlights when they are not in use.

DISCLOSURE OF THE INVENTION

The present invention provides a contoured concealment lens for vehicle headlights. The lens conforms to the contour of the vehicle body and includes an internal cavity that is selectively filled with an opaque fluid when the headlights are not in use. The concealment lens has no adverse influence on the aerodynamics of the vehicle when the lights are in use and it is aesthetically compatable with the vehicle at all times.

An object of the present invention is the provision of an improved concealment device for vehicle headlights.

Another object is to provide a concealment device for vehicle headlights that has no influence on the aerodynamics of the vehicle.

A further object of the invention is the provision of a contoured concealment lens that is aesthetically pleasing whether or not the vehicle headlights are in use.

Still another object is to provide a contoured concealment device that is simple in structure and easy to maintain.

A still further object of the present invention is the provision of a contoured concealment device for vehicle headlights that is reliable.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a cut-away perspective view illustrating the forward portion of a vehicle wherein each of the headlights is fitted with the contoured headlight concealment lens of the present invention;

FIG. 2 is a top plan sectional view taken along line 2—2 of FIG. 1, and showing the position of the top portion of the concealment lens and the headlight in dashed lines;

FIG. 3 is an enlarged side elevation sectional view taken along line 3—3 of FIG. 2, showing the attachment of the lens to conform to the contour of the vehicle body and the vacuum system used to selectively fill the lens cavity with an opaque fluid;

FIG. 4 is a greatly enlarged side elevation sectional view showing the location of the ball check valve at the inlet to the vacuum line when a vacuum is applied and the lens cavity is filled with opaque fluid;

FIG. 5 is a greatly enlarged side elevational sectional view illustrating the vacuum selector switch positioned to prevent the application of a vacuum on the lens cavity;

FIG. 6 is a sectional view similar to FIG. 4, but showing the location of the ball check valve when no vacuum is applied and the opaque fluid is drained from the lens cavity; and FIG. 7 is a greatly enlarged side elevation sectional view showing the opaque fluid reservoir located at the bottom of the lens cavity.

BEST MODE FOR CARRYING OUT THE INVENTION

Referring now to the drawings, wherein like reference numerals designate identical or corresponding parts throughout the several views, FIG. 1 shows the contoured headlight concealment device (10) of the present invention installed on the forward portion of a vehicle (2) such that the outer surface of the concealment device (10) smoothly conforms to the contour of the vehicle body (4) and overlies each of the vehicle headlights (6).

As most clearly shown in FIGS. 2 and 3, the concealment device (10) includes a transparent lens (12) having an internal cavity (14). It is to be understood that the lens (12) could be formed of shatter-resistant glass, plexiglass, or any other suitable transparent material. The upper portion of the cavity (14) converges to a point (FIG. 2, dashed line) and is disposed beneath the vehicle body (4). The lower portion of the cavity is co-extensive with and overlies an opening (8) in the vehicle body (4) located forward of the headlight (6). The concealment device (10) and the vehicle body (4) are interconnected by a sealing bracket (9) which is attached to the body (4) adjacent the inside surface of the opening (8).

As best shown in FIGS. 2, 4 and 6, the upper portion of the cavity (14) terminates in a vacuum port (16) that is connected to a vacuum line (18). An enlarged area (20) is formed in the cavity (14) adjacent the vacuum port (16) and receives a lightweight ball (22).

Referring now to FIGS. 3 and 7, the lower portion of the cavity (14) is in communication with a fluid reservoir (30). The reservoir (30) has a fluid volume sufficient to fill the cavity (14) and the enlarged area (20) with a safe reserve level remaining. A flexible diaphragm (32) is attached to the upper portion of the reservoir (30) by retainer (34). The diaphragm (32) is positioned adjacent a vent (36) in the top of the reservoir (30).

As illustrated by FIGS. 3 and 5, the vacuum line (18) is connected to a distribution diaphragm (40) that is in simultaneous communication with the cavities (14) of both lenses (12). The diaphragm (40) is connected by line (42) to a vacuum selector switch (50). The switch (50) is also connected by line (44) to the vehicle's engine vacuum canister (not shown). The switch (50) is mounted in the vehicle passenger compartment within easy reach of the operator.

The vacuum selector switch (50) includes a body section (52) having a vacuum opening (54), a vent opening (56), and a common opening (58). The common opening (58) is in communication with the distribution diaphragm (40) through line (42). The interior of the body section (52) slidably receives a block (60) having a passageway (62) formed therein. The block (60) is selectively positioned by movement of the finger tab (64).

Any suitable opaque fluid (70) can be used in the device (10). For example, mercury or an alcohol solution tinted to match or be compatable with the color of the vehicle body (4) would provide an opaque fluid (70) having a low freezing point.

In operation, the internal cavity (14) is selectively filled or emptied of the opaque fluid (70) by selective positioning of the vacuum control switch (50). When the switch (50) is positioned as shown in FIG. 3, the vacuum from the vehicle's vacuum canister is applied to the cavities (14) of each device (10) through the distribution diaphragm (40). The vacuum applied draws the opaque fluid (70) up from the reservoir (30) to completely fill the cavity (14) and the enlarged area (20) until the fluid (70) contacts the lightweight ball (22) and it floats up to seat against the vacuum port (16) as shown in FIG. 4. The opaque fluid (70) thus will fill the cavities (14) to conceal the headlights (6) when they are not in use. It is to be understood that the switch to operate the headlights (6) could be incorporated in or activated by the vacuum control switch (50) or separately activated.

When the switch (50) is positioned as illustrated in FIG. 5, the cavities (14) are vented to the atmosphere through vent opening (56). The opaque fluid (70) then flows by gravity into the reservoir (30), thereby allowing the passage of light from the headlight (6) through the transparent lens (12).

Thus, it can be seen that at least all of the stated objectives have been achieved.

Obviously, many modifications and variations of the present invention are possible in light of the above teachings. It is therefore to be understood that, within the scope of the appended claims, the invention may be practised otherwise than as specifically described.

I claim:

1. In a headlight concealment device for use in conjunction with a vehicle including a contoured body, the improvement comprising:

headlights operably attached to said vehicle and disposed beneath said contoured body and disposed to selectively project light through an opening in the forward position of said contoured body;

a transparent lens disposed over said opening and being attached to said contoured body such that said lens smoothly conforms to the contour of said vehicle body, said lens including an internal cavity that is co-extensive with and overlies said opening; wherein, the upper portion of the internal cavity terminates in a vacuum port; and, an enlarged area is formed in the internal cavity adjacent said vacuum port;

an opaque fluid reservoir attached to said vehicle and disposed in fluid communication with said internal cavity;

a ball disposed in said enlarged area of the internal cavity and adapted to move from a location spaced from said vacuum port to a position blocking fluid communication through said vacuum port; wherein, said ball has a specific gravity that is less than the specific gravity of the opaque fluid; and, means for selectively filling said internal cavity with an opaque fluid, thereby concealing said headlights when they are not in use; wherein, said means for selectively filling the internal cavity with opaque fluid includes means for applying a vacuum through said vacuum port to said cavity; whereby, the level of the opaque fluid within the cavity will cause the ball in the enlarged area of the internal cavity to float to a position blocking fluid communication through said vacuum port.

2. The device of claim 1, wherein said means for applying a vacuum includes a vacuum selector switch operably interconnecting said cavity and a vehicle engine vacuum canister.

3. The device of claim 2, wherein said vacuum selector switch includes:

a switch body having a vacuum opening, a vent opening, and a common opening, said common opening being in communication with said cavity;

a block slidably received in said switch body and having a passageway formed therein, said passageway being selectively positioned to interconnect one said common opening with one of said vent opening or said vacuum opening.

* * * * *